United States Patent
Metzger

(10) Patent No.: US 7,101,580 B2
(45) Date of Patent: Sep. 5, 2006

(54) METHOD OF BLEACHING CEREAL GRAINS

(75) Inventor: Lloyd E. Metzger, Champlin, MN (US)

(73) Assignee: General Mills, Inc., Minneapolis, MN (US)

( * ) Notice: Subject to any disclaimer, the term of this patent is extended or adjusted under 35 U.S.C. 154(b) by 165 days.

(21) Appl. No.: 10/315,763

(22) Filed: Dec. 10, 2002

(65) Prior Publication Data

US 2003/0082280 A1    May 1, 2003

Related U.S. Application Data

(63) Continuation of application No. 09/392,699, filed on Sep. 9, 1999, now Pat. No. 6,497,909.

(51) Int. Cl.
*A23L 1/10* (2006.01)
*A23L 1/172* (2006.01)

(52) U.S. Cl. ............... 426/253; 426/254; 426/618

(58) Field of Classification Search ............. 426/253, 426/254, 258, 615, 618
See application file for complete search history.

(56) References Cited

U.S. PATENT DOCUMENTS

| | | | |
|---|---|---|---|
| 4,649,113 A | 3/1987 | Gould | |
| 4,806,475 A | 2/1989 | Gould | |
| 4,919,952 A | 4/1990 | Sadaranganey et al. | |
| 5,089,282 A | 2/1992 | Wellman | |
| 5,219,601 A | 6/1993 | Devic | |
| 5,391,389 A | 2/1995 | George et al. | |
| 5,480,788 A | 1/1996 | Devic | |
| 5,871,800 A | 2/1999 | George et al. | |

FOREIGN PATENT DOCUMENTS

WO    96/25862    8/1996

OTHER PUBLICATIONS

Anderson et al., "An Analysis Of Dietary Fiber Content Of A Standard Wheat Bran", pp. 336-340, 1980.
Hoseney, C.R., "Principles of Cereal Science and Technology", 2$^{nd}$ Ed., pp. 130-131, 1994.
Ramulu et al., "Effect Of Processing On Dietary Fiber Content Of Cereals And Pulses".

*Primary Examiner*—Arthur L. Corbin
(74) *Attorney, Agent, or Firm*—John A. O'Toole; Everett G. Diederik, Jr.; Douglas J. Taylor

(57) ABSTRACT

The present invention describes bleached grain products such as bleached whole wheat flour that are obtained having the color and taste of white flour by bleaching whole wheat kernels prior to conventional flour milling. The wheat kernels are treated with a peroxide solution to lighten the color of the bran layers. The bleached grain kernels can be tempered and milled into whole grain flours having 10% to 12% dietary fiber from the bran but which are white in color and bland in flavor. The whitened, high fiber whole wheat flours can be used to prepare good tasting, and nutritious products such as baked goods such as breads and pastries as well as pasta product, and ready-to-eat cereals or grain based snacks.

27 Claims, No Drawings

METHOD OF BLEACHING CEREAL GRAINS

The present application represents a continuation of U.S. patent application Ser. No. 09/392,699, filed Sep. 9, 1999, now U.S. Pat. No. 6,497,909.

FIELD OF THE INVENTION

The present invention relates to food products and to methods for their preparation. More particularly, the present invention is directed towards bleached grain products such as whole wheat flour, to bleached grain intermediate products such as bleached wheat kernels and to their methods of preparation.

BACKGROUND OF THE INVENTION

The present invention provides improvements in the processing or treatment of grains such as wheat. More particularly, the present invention is directed towards the provision of whole grain flour such as whole wheat with the color and taste comparable to white flour or a "white" whole wheat flour. Also, the present invention provides methods for preparing such improved white whole wheat flour and further to intermediate products useful in the production of such improved finished products as white whole wheat flour. Such intermediate products include, for example, bleached grain kernels such as bleached wheat kernels.

Most consumers have experienced and readily recognize the difference between whole wheat bread and ordinary white bread. Most consumers also know that whole wheat bread is more nutritious, but consume white bread anyway, because they like the taste better. This is especially true of children who can be particularly selective in food choices.

Through a particular treatment process, the present invention is able to lighten the darker color of whole wheat flour, and all but eliminate the bitter flavors. As a result, the present invention provides whole wheat flours that can be used to provide finished whole wheat products that look and taste as good as those made with regular white flour.

The principle species of wheat are *Triticum vulgare* or bread wheat; *T. durum* which has extra hard kernels used primarily for macaroni and related pasta products; and *T. compactum* or club wheat, which has very soft kernels. Numerous varieties and cultivars within each species are known.

All wheat generically comprise a major starchy endosperm, a smaller germ or sprouting section of the seed and a surrounding bran or husk layer. The endosperm makes up about 82–83% of the wheat kernel and is used in the production of flour. Typically, the bran makes up 14–15%, is removed from the kernel and is used in animal and poultry feed. However, the bran can also be milled along with the endosperm to produce whole wheat flour. The germ is usually separated from the rest of the kernel because its fat content limits the shelf life of the flour. The bran with or without the germ is sometimes referred to as "millfeed". Some special purpose whole grain flours include not only the bran but also the germ fraction.

In the United States, wheat is classified according to whether it is hard or soft, white or red, and planted in winter or spring.

Soft or spring wheat is typically planted in the spring and harvested later in the fall. Soft wheat is normally white wheat. White soft wheat is used for the donut and pastry industries since a white color and bland taste are essential flour quality attributes.

Hard or winter wheat is typically planted in the fall and harvested the following season in mid-summer. Winter wheat is normally red. Hard or red wheat is used for bread production. Red wheat has a distinctive taste due to tannins in the bran. To minimize the amount of these flavor-bearing tannins, the wheat grain is milled so as to have as small a fraction as possible of the bran containing these tannins. Naturally white hard wheat is also increasingly available commercially and being used more and more.

Even though the endosperm fraction is about 83%, in a typical flour milling process, the extraction rate of white patent flour generally runs about 72–75%. That is, for every hundred pounds of wheat, about 72–75 pounds of flour is obtained. This flour contains about 1–2% dietary fiber from small amounts of the bran. The balance millfeed is very low value comprising bran and germ although containing some of the desirable endosperm.

The milling process can be adjusted to obtain an increase in the flour yield but at the cost of including some of the bran. The presence of bran may lower the quality and thus value of the flour more than the increase in the value of the increase in yield. That is, the amount of flour obtained during the milling process is limited by contamination of the flour with bran that deteriorates flour quality. For flour made from red wheat, less bran in the flour can be tolerated due to the presence of more color and flavor tannins in the bran. The darker bran typically makes the flour grayish in color, and also imparts bitter flavors.

The present invention provides a particular chemical lightening treatment or wetting process, or wet bleaching process that bleaches wheat kernels after cleaning but prior to milling. Since wheat is typically wet tempered prior to milling anyway, this process is commercially practical with existing milling systems.

The principle advantage of the present invention is the provision of white whole grain flour having a high fiber content ($\approx$11–12%) and other nutritional advantages of a whole grain flour that nonetheless has a white color and bland flavor comparable to conventional white flour. Since additional endosperm is associated with the bran is also included, the yield of the flour milling process is surprisingly and, dramatically increased. More surprisingly, the amount of flour obtained can be increased without deterioration in flour quality in terms of color and flavor.

Still another benefit is that the present invention provides enzyme inactivation that increases the stability of the flour.

Still another benefit is that the present invention provides substantial reductions in the viability of toxin producing molds and reductions in levels of mycotic toxins in the flours that can occur as a result of mold growth prior to milling.

These and further objects and advantages of the present invention will become clearer in light of the following detailed description of an illustrative embodiment of this invention described in connection with the drawings.

SUMMARY OF THE INVENTION

In its method of preparation aspect, the present invention resides in methods of treating wheat prior to milling, essentially comprising the step of: treating whole grain kernels having an exterior bran layer with peroxide to decrease the color of the bran layer to provide a lightened grain kernel.

In its principal product aspect, the present invention resides in finished whole flour products characterized by high levels of dietary fiber, i.e., from the bran but which nonetheless have a white color and bland flavor of white flavors having only 1% to 2% fiber from bran.

In still another product aspect of one and the same invention, the present invention further provides intermediate products such a bleached or whitened grain kernels suitable for use in producing the present finished whole grain flours.

DETAILED DESCRIPTION OF THE INVENTION

The present invention is directed towards bleached grain products such as whole wheat flour, to bleached grain products intermediate products such as bleached wheat kernels and to their methods of preparation. Each of the treatment method steps are described in detail as follows.

The starting material for use herein is cleaned dry or "milling quality" wheat kernels. Unprocessed commodity wheat is first prepared for milling in substantially conventional manner. The wheat preparing process typically involves several well-known cleaning steps to produce clean dry milling quality wheat. For example, the wheat preparing process typically involves a magnetic separator that removes iron or steel particles that dirty the wheat during harvest and transportation. Various screening steps such as reciprocating screens are also used to separate stones, sticks and other coarse and fine materials. The wheat can be fed to an air aspirator to remove other light impurities. A disc separator can be used to remove barley, oats, cockle and other foreign seeds. A scourer such as beaters in a screen cylinder scour off impurities and roughage. The various cleaning steps can be practiced in any convenient manner to provide the dry cleaned or milling quality wheat starting material for use herein.

The preferred starting material preferably consists of whole intact kernels to minimize exposure of the endosperm to the bleaching treatment steps herein.

The present invention finds particular suitability for use in connection with the provision of whole flours of wheat. While the present invention is thus described with particular reference to wheat, the present invention also finds usefulness in the provision of whole flours of other common major cereal grains including those of corn (maize), soybeans, oats, rice, barley and mixtures thereof. While these major grains are most popular, minor useful grains include amaranth, millet, sorghum, triticale, flax and mixtures thereof. The present invention also finds particular suitability for use for rice products.

While red wheat can be beneficially treated using the present methods, the preferred starting material is white wheat whether of a soft variety or the less common hard variety. White wheat is preferred due to brightness or whiteness of the whole wheat flour prepared from bleached wheat from white wheat as a starting material.

The present methods essentially comprise the step of treating the grain with a peroxygen compound especially hydrogen peroxide $H_2O_2$. The peroxide treatment results in bleached or whitened whole grain kernels.

In the preferred embodiment, the present methods involve a combination treatment comprising a treatment of the wheat kernels with an alkaline solution and a peroxide solution. In a less preferred embodiment, the present methods comprise treatment of the grain with only a peroxide solution. In the most preferred embodiment, the grain is treated with the alkaline solution and the peroxide solution simultaneously.

In another embodiment, the alkaline treatment and peroxide treatment are practiced as separate sequential steps.

A peroxide bleaching or whitening treated is desirable herein since the residual peroxide degrades into harmless oxygen and water. In contrast, other types of bleaching techniques can result in either undesirable modification of the function properties of the finished flour or undesirably high or even illegal concentrations of residual bleaching agents or both.

Useful herein are peroxygen concentrations of about 5% to 40%, preferably about 6% to 40% and most preferably about 10% to 40%.

The temperature of the peroxide treatment step can range from ambient temperature (about 50° F.) to about 165° F. (73.9° C.). Preferably, both the peroxide solution and the grain are each warm. Better results are obtained when the treatment step is practiced with both grain and peroxide solution heated to about 130° to 165° F. (54.4° to 73.9° C.), and for best results about 160° to 165° F. (71.1° to 73.9° C.). Higher temperatures are preferred since higher temperature increase the effectiveness of the peroxide. However, excessively high temperatures are undesirable since exposure of the grain to these higher temperatures can adversely heat denature their proteins.

The amount of peroxide employed depends upon a variety of processing parameters and desired level of bleaching. Due to the cost of peroxide, the minimum amount required to accomplish the desired level of bleaching is generally used.

To assist in the minimum consumption or usage of peroxide, preferably, the peroxide solution can optionally additionally further comprises a peroxide stabilizing agent. For example, sodium silicate (at about 1%) and/or magnesium sulfate (at about 0.1%). Also, the peroxide solution can further optionally additionally include a chelating agent such as ethylenediaminetetraacetate ("EDTA") can optionally be added to remove any metal ions which may otherwise bind to destroy the peroxide.

Still another optional ingredient in the peroxide solution is a conventional deforming agent (e.g., about 0.1% to 1%). Addition or inclusion of a defoaming agent is desirable to minimize the generation of any foaming caused by any gas evolution that occurs during the peroxide treatment step. The presence of a defoaming agent is especially useful when a $CO_2$ gas generating alkaline material is employed such as sodium bicarbonate as further described herein. Gas foaming is mildly undesirable in processing commercial quantities of grain.

The amount of hydrogen peroxide can vary depending upon the efficiency of the process parameters and the degree of bleaching desired. Good results are obtained when the weight ratio of hydrogen peroxide to flour ranges from about 1 to 5 parts to 100 parts grain.

The treatment step can be practiced by, for example, applying an aqueous solution of hydrogen peroxide to the grain kernels. This application can be practiced by immersing the grain into an aqueous bath or great excess of peroxide solution. To reduce the consumption of peroxide, the application step is preferably practiced by wetting the grain or applying only enough peroxide solution to coat the grain surfaces. A preferred technique for practicing this wetting variation of the application or treatment step is to spray the peroxide solution onto the grain, preferably with agitation or movement of the grain.

In one embodiment the method of the present invention generally involves a step B of treating the wheat kernels with an alkaline solution, optionally drying the wheat kernels and subsequently practicing the step A of treating them with the peroxygen solution.

In this embodiment, step B preferably involves wetting the wheat kernels with an alkaline solution. Alkaline solutions of 1% to saturated having approximate temperatures of 50° to 165° F. preferably 130° to 165° F. and most preferably 160° to 165° F. can be used in the process, particularly when applied to the wheat kernels. Any food grade alkaline material can be used including sodium carbonate, sodium bicarbonate, sodium hydroxide, potassium hydroxide and mixtures thereof. The preferred method utilizes food grade sodium hydroxide, sodium carbonate or sodium bicarbonate.

The alkaline treatment solution can comprise from about 1% to about 10% of the alkaline material. When applied as a separate treatment step, sufficient amounts of the alkaline solution are applied to thoroughly wet the surface of the grains. Good results are obtained in this treatment of wetting step when about 10% to 15% of the alkaline solution are applied to a the wheat or other grain kernels. That is about 10–15 kilogram of alkaline solution for every 100 kg of grain.

The duration of the alkaline treatment step is short and just long enough for the alkaline solution to infuse the outmost bran layers yet minimize infusion into the endosperm. Good results are obtained when the treatment step range from about 30 seconds to about five minutes, preferably about 30 seconds to about three minutes.

In a preferred embodiment, the alkaline treatment step B is practiced by applying or wetting the grain by spraying.

In those less preferred embodiments wherein the grain is added to a bath or an excess of the alkaline solution, the alkaline solution wetted wheat are next preferably allowed to drain and to dry e.g., drip dry.

After drying, the alkaline treated grain kernels can then treated with or again wetted using a peroxygen compound. Hydrogen peroxide is most preferred for economic reasons.

Peroxygen concentrations of 10–40% work particularly well in the process when applied to the wheat temperatures of approximately 50° to 165° F. for durations of between 30 seconds to 3 minutes. Although bleaching will be successful when the wheat are treated with peroxygen solutions having temperatures greater than 165° F. or higher, higher temperatures should preferably be avoided with longer contact time to prevent protein degradation.

In the most preferred embodiment the alkaline solution and the hydrogen peroxide solution are admixed and immediately thereafter applied thus simultaneously to the grain kernels. In a preferred variation, the treatment step is practiced with added heating especially with microwave heating. On an industrial scale practicing of the present methods, microwave heating may not be economical.

When the peroxygen solution is applied to the alkaline treated wheat, the peroxygen and the alkaline solutions undergo a chemical reaction. The first wetting step causes the alkaline solution to slightly saturate the outer bran layer (and hopefully not the interior endosperm) during the first wetting step, so that applying the peroxygen solution to the wheat causes the chemical reaction between the two solutions to occur directly on the exterior of the grain the reaction it is believed causes the formation of an alkaline hydroperoxide radical, which is a bleaching agent that causes the color in the bran. Because this reaction occurs on the surface of the kernel, the full magnitude of the reaction is utilized in bleaching the bran.

When an alkaline material is used that generates $CO_2$, the reaction of the peroxygen and alkaline solutions forms and liberates a burst of gas bubbles. If residues such as soil, ground mould, or bacteria such as aflotoxins are present on the grain kernels the treatment beneficially tends to clean or reduce the degree of contamination.

The concentrations, temperatures, and wetting times described above are preferred ranges. For both the peroxygen solution and the alkaline solution, many different combinations of concentration, temperature, and wetting time will cause bleaching of the bran or wheat kernels and these variables may be adjusted to provide varying levels of whiteness of the treated wheat.

Wheat grain is a low cost commodity. At present, the cost of peroxide per pound is about 10 times the price of wheat grain treated. An advantage of using an alkaline treatment is to minimize the amount of peroxide required to achieve the desired bleaching or whitening effect. While peroxide treatment alone can be used to practice the present grain treatment, the amount of peroxide required to achieve desired levels of whitening of the grain are high and thus costly relative to the amount required when an alkaline pretreatment is employed. Also, surprisingly, the amount of peroxide required is slightly less when the alkaline solution is admixed with the peroxide solution immediately prior to application only the grains.

If desired, the present methods can further include a rinse washing step prior to the tempering step. Such a washing step can remove any residual peroxide or alkaline material. Residual alkaline material can impart an undesirable soapy flavor to the finished flour.

For those sequential treatment variations, if desired, the present methods can further include an intermediate drying step to reduce all or a portion of the moisture added by the alkaline solution treatment or wetting step.

The present methods can further optionally include a finish acidic washing step. Increasing the amount of alkaline material employed beneficially reduces the amount of peroxide required to accomplish desired levels of bleaching. However, residual alkaline material can result in the pH of the finished white sole wheat flour from a conventional pH of about 6.3 to over 6.7. At such high pH values, the baking and other functional properties of the four can be adversely affected. The present optional methods are desirably practiced so as to provide a whole wheat flour having a pH of about 6.3 to 6.8, preferably about 6.3 to 6.7.

An unexpected advantage of the present invention is that such surface treatment reduces the level of mold and other bacteriological contamination of the grain. As a result, the finished flour product can have lower levels of undesirable toxins associated with mold growth.

Treatment of the bran while still an intact portion of the grain kernels provides greater control over the bleaching process and provides for easier physical manipulation than treatment of bran in an isolated particulate form. In particulate form, the bran tends to undesirably clump an is difficult to handle and to control the treatment step.

As a result of treating, for example, red hard wheat, the color of the resultant bleached grain kernel intermediate product is similar to white hard wheat. Of course, white or hard wheat grain is increasingly more widely available. However, even though the visual appearance of the present bleached wheat is similar to naturally colorless white hard wheat, the genetic profile of the present bleached wheat still contains the color producing gene alleles of red wheat.

Wheat kernels going into the tempering step generally have a starting moisture content ranging from about 10% to 12%. The tempering step generally involves steeping or admixing the grain with water. The purpose of the tempering step is to both toughen the outer bran coats for easier separation. The absorbed water also softens or mellows the endosperm to facilitate the subsequent breaking or milling operations. Generally, the tempering step is conducted at ambient temperature. The tempering is continued for times sufficient for the kernels to reach moisture contents ranging from about 14% to 16%, preferably about 15% to 16%. While not critical per se, good results are generally obtained when the tempering step is practiced for holding times ranging from about 10–14 hours, preferably about 11–13 hours and for best results about 12 hours.

The tempering step can be conveniently practiced utilizing conventional drying apparatus and techniques.

Thereafter, the bleached and tempered grain kernels can be milled in a conventional manner to provide whole grain flours. In a preferred variation, the milling step is practiced to separate out the germ fraction to provide a whole grain flour substantially comprising only the bran and endosperm but not the germ fraction.

The finished whole wheat flour provided herein has a color and taste very similar to conventional white flour even though the total dietary fiber content ranges from 8% to 12% preferably about 10% to 12% provided by the bran. The improved color is not only readily visually apparent but also can be easily measured using conventional colorometry equipment and techniques. The flour preferably ranges in pH from about 6.3 to 6.7.

Still another unexpected advantage resides in the reduced level of enzyme activity in the finished flour products prepared from the present intermediate bleached grain kernels herein. For those whole grain flower finished products that additionally contain a germ fraction, such reduced enzyme activity levels is especially beneficial in extending the shelf like of such flours. Also, while not wishing to be bound be the proposed theory, it is speculated herein that enzyme inactivation, particularly of browning causing enzymes, is the mechanism responsible for the resistance to browning during extended shelf storage at room temperatures that some whole grain flows can experience.

Still another surprising advantage of the present invention is that the present peroxide treatment while providing the benefit of inactivating various enzymes does not result in gluten inactivation such as can occur using a heat treatment for enzyme inactivation.

Still another surprising advantage of the present invention resides in the increase in gluten strength of doughs prepared from flour products of the present invention. Gluten activity is important to bread making and some batter applications such as for muffins. Not only does the present enzyme inactivation benefit occur without decreasing gluten strength, the present invention actually provided gluten strengthening benefits. Subsequent conventional flour treatment to increase gluten strength such as by treatment with or addition potassium bromate can be minimized or even eliminated. Thus, high gluten strength, bromate free whole flour is provided.

Also provided herein are whole wheat flours of a high quality taste and flavor that have enhanced gluten strength.

The present whitened high quality whole wheat flours can be used to prepare a wide variety of finished grain based food products. The flours can be used to prepare white whole grain breads, pastries, baked goods (e.g., muffins, quick breads, layer cakes), and griddle cakes such as pancakes. The whole grain flours can be sold in bulk or in smaller quantities, e.g., 1 kg at retail in conventional packages. The present whole grain flours can be used as ingredients in dry mixes for such finished food products. The present intermediate grain products and can be used in the preparation of ready-to-eat cereals or grain based snack products.

Even the mill feed byproducts of the present invention are of higher value and quality by virtue of the reductions in color and flavor. The present invention also can be used to provide improved low fiber flour (1–2% dietary fiber) of improved quality of even lower flavor and whiter color.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method of bleaching cereal grains, comprising the steps of:
   A. treating whole grain kernels having at least an exterior bran layer and an inner endosperm with peroxide to decrease the color of the bran layer by applying the peroxide to the bran layer, wherein only enough peroxide is applied to coat a grain surface of each grain kernel.

2. The method of claim 1 wherein the cereal grains are cleaned to provide milling quality grain prior to treatment with peroxide.

3. The method of claim 1 wherein the cereal grains are selected from the group consisting of wheat, rice, barley, corn (maize), oats, triticale, amaranth, and soybeans.

4. The method of claim 3 wherein the cereal grains are selected from the group consisting of wheat, rice, barley and soybeans.

5. The method of claim 4 wherein the cereal grains are selected from the group consisting of wheat and rice.

6. The method of claim 1 wherein the cereal grains are wheat.

7. The method of claim 6 wherein the cereal grains are red wheat.

8. The method of claim 6 wherein the cereal grains are white wheat.

9. The method of claim 8 wherein the white wheat is a hard wheat.

10. The method of claim 1 wherein the treatment with peroxide step A comprises applying a peroxide solution to the cereal grains.

11. The method of claim 1 wherein the treatment with peroxide step A comprises spraying the peroxide solution onto the grain kernels.

12. The method of claim 1 wherein step A includes applying an aqueous solution of about 6% to 40% $H_2O_2$ at a temperature of about 50° to 165° F. for about 30 seconds to three minutes.

13. The method of claim 12 further comprising applying about 1 to 5 parts $H_2O_2$ per 100 parts of grain.

14. The method of claim 1 additionally comprising the step of:
   B. treating the whole grain kernels with an alkaline solution.

15. The method of claim 14 wherein the alkaline solution is supplied from about 1% to saturation in amounts of about 10 parts to 15 parts (dry weight) of alkaline material per 100 parts grain.

16. The method of claim 15 wherein step B is practiced at a temperature of about 130° to 165° F.

17. The method of claim 14 wherein step B is practiced as a separate prior step.

18. The method of claim 14 wherein step B is practiced simultaneously with step A.

19. The method of claim 18 wherein the alkaline solution and peroxide solution are combined immediately prior to application onto the grain.

20. The method of claim 19 wherein the treatment is practiced at temperature of 100° to 165° F.

21. The method of claim 20 wherein the treatment step is practiced with supplemental heating during the step.

22. The method of claim 14 additionally comprising the step of tempering the treated grains to provide tempered grain.

23. The method of claim 1 additionally comprising the step of tempering the treated grains to provide tempered grain.

24. The method of claim 23 additionally comprising the step of milling the tempered grain to provide a whole grain flour.

25. The method of claim 24 wherein the milling step is practiced to provide a whole grain flour without a germ fraction.

26. A method of bleaching cereal grains, comprising the steps of:
- A. treating whole cereal grain kernels having at least an exterior bran layer and an inner endosperm with peroxide to decrease the color of the bran layer by applying the peroxide to the bran layer, while minimizing exposure of the endosperm to the peroxide to provide lightened cereal grain kernals, said treatment being practiced at a temperature of 100° to 165° F. and with supplemental heating during said treatment, wherein at least a portion of the supplemental heating is supplied by microwave heating; and
- B. treating the whole grain kernels with an alkaline solution, the alkaline solution and the peroxide solution being combined immediately prior to application onto the grain kernals wherein step B is practiced simultaneously with step A.

27. A method of bleaching cereal grains, comprising the steps of:

applying to whole cereal grains, having an exterior bran layer and an inner endosperm, an alkaline solution of sodium bicarbonate or sodium hydroxide at a concentration of about 1% to 10% and a temperature of about 50° to 165° F. in a weight ratio of alkaline solution to cereal grains ranging from about 10:100 to about 15:100 for about 30 seconds to three minutes, and ten applying a peroxide solution at a concentration of about 5% to 40% $H_2O_2$ to the cereal grains for about 30 seconds to the three minutes at a temperature of about 50° to 165° F. to bleach the bran layer, wherein only enough peroxide is applied to coat a grain surface of each cereal grain.

* * * * *